US 6,684,008 B2

(12) United States Patent
Young et al.

(10) Patent No.: US 6,684,008 B2
(45) Date of Patent: Jan. 27, 2004

(54) PLANAR PHOTONIC BANDGAP STRUCTURES FOR CONTROLLING RADIATION LOSS

(75) Inventors: Jeff F. Young, North Vacouver (CA); Allan R. Cowan, Vancouver (CA); Vighen Pacradouni, Vancouver (CA)

(73) Assignee: The University of British Columbia, Vancouver (CA)

( * ) Notice: Subject to any disclaimer, the term of this patent is extended or adjusted under 35 U.S.C. 154(b) by 164 days.

(21) Appl. No.: 09/941,100

(22) Filed: Aug. 28, 2001

(65) Prior Publication Data

US 2002/0036299 A1 Mar. 28, 2002

Related U.S. Application Data

(60) Provisional application No. 60/230,056, filed on Sep. 1, 2000.

(51) Int. Cl.[7] .................................................. G02B 6/26
(52) U.S. Cl. ..................... 385/31; 385/129; 385/131; 385/132
(58) Field of Search ............................ 385/14, 31, 32, 385/129, 131, 132, 15

(56) References Cited

U.S. PATENT DOCUMENTS

| | | | |
|---|---|---|---|
| 3,095,549 A | 6/1963 | Butler | 333/84 |
| 4,675,620 A | 6/1987 | Fullerton | 333/1 |
| 4,961,619 A | 10/1990 | Hernandez-Gil et al. | 350/96.12 |
| 5,157,756 A | 10/1992 | Nishimoto | 385/129 |
| 5,187,461 A | 2/1993 | Brommer et al. | 333/219.1 |
| 5,389,943 A | 2/1995 | Brommer et al. | 343/909 |
| 5,406,573 A | 4/1995 | Ozbay et al. | 372/43 |
| 5,440,421 A | 8/1995 | Fan et al. | 359/344 |
| 5,471,180 A | 11/1995 | Brommer et al. | 333/202 |
| 5,526,449 A | * 6/1996 | Meade et al. | 385/14 |
| 5,600,483 A | 2/1997 | Fan et al. | 359/344 |
| 5,677,924 A | 10/1997 | Bestwick | 372/96 |
| 5,684,817 A | * 11/1997 | Houdre et al. | 372/45 |
| 5,688,318 A | 11/1997 | Milstein et al. | 117/1 |
| 5,748,057 A | 5/1998 | De Los Santos | 333/134 |
| 5,751,466 A | 5/1998 | Dowling et al. | 359/248 |
| 5,784,400 A | 7/1998 | Joannopoulos et al. | 372/96 |
| 5,987,208 A | 11/1999 | Grüning et al. | 385/146 |
| 6,101,300 A | 8/2000 | Fan et al. | 385/27 |
| 6,134,043 A | 10/2000 | Johnson et al. | 359/237 |
| 6,134,369 A | * 10/2000 | Kurosawa | 385/132 |
| 6,175,671 B1 | 1/2001 | Roberts | 385/14 |
| 6,198,860 B1 | 3/2001 | Johnson et al. | 385/28 |
| 6,204,952 B1 | 3/2001 | Hinkov et al. | 359/245 |
| 6,310,991 B1 | 10/2001 | Koops et al. | 385/14 |
| 6,380,551 B2 | * 4/2002 | Abe et al. | 257/15 |
| 2001/0026668 A1 | * 10/2001 | Yamada | 385/125 |
| 2003/0039446 A1 | * 2/2003 | Hutchinson et al. | 385/39 |

FOREIGN PATENT DOCUMENTS

| | | |
|---|---|---|
| DE | 195 26 734 | 1/1997 |
| DE | 196 28 355 | 3/1997 |

(List continued on next page.)

OTHER PUBLICATIONS

Wendt et al., "Nanofabrication of photonic lattice structures in GaAs/AlGaAs", *Journal of Vacuum Science & Technology B*, vol. 11, No. 6, pp. 2637–2640, Nov./Dec. 1993.

(List continued on next page.)

*Primary Examiner*—Hemang Sanghavi
(74) *Attorney, Agent, or Firm*—Oyen Wiggs Green & Mutala

(57) ABSTRACT

The present planar photonic bandgap structures achieve improved control over radiation losses by employing layered dielectric structures. These structures control radiation losses incurred in connection with planar photonic bandgap structures and waveguides, waveguide bends, waveguide crossings, filters, switches and fiber-coupling structures in which such planar photonic bandgap structures are used.

36 Claims, 17 Drawing Sheets

FOREIGN PATENT DOCUMENTS

| | | |
|---|---|---|
| EP | 0 473 983 | 3/1992 |
| GB | 2343964 | 5/2000 |
| JP | 06-252504 | 9/1994 |
| JP | 10-284806 | 10/1998 |
| WO | WO 95/30917 | 11/1995 |
| WO | WO 96/27225 | 9/1996 |
| WO | WO 97/04340 | 2/1997 |
| WO | WO 98/25314 | 6/1998 |
| WO | WO 98/44368 | 10/1998 |
| WO | WO 98/53350 | 11/1998 |
| WO | WO 98/53351 | 11/1998 |
| WO | WO 00/10040 | 2/2000 |
| WO | WO 00/17679 | 3/2000 |
| WO | WO0036664 | 6/2000 |

OTHER PUBLICATIONS

Meade et al., "Novel applications of photonic band gap materials: Low–loss bends and high Q cavities", *J. Appl. Phys.*, vol. 75, No. 9, pp. 4753–4755, May, 1994.

Hirayama et al., "Novel surface emitting laser diode using photonic band–gap crystal cavity", *Appl. Phys. Lett.*, vol. 69, No. 6, pp. 791–793, Aug., 1996.

Foresi et al., "Photonic–bandgap microcavities in optical waveguides", *Nature*, vol. 390, pp. 143–145, Nov., 1997.

El–Kady et al., "Dielectric Waveguides in Two–Dimensional Photonic Bandgap Materials" *Journal of Lightwave Technology IEEE*, New York, vol. 17, No. 11, Nov. 1999 (Jan. 1999), pp. 2042–2049.

Mekis et al., "High Transmission through Sharp Bends in Photonic Crystal Waveguides", *Physical Review Letters*, vol. 77, No. 18, pp. 3787–3790, Oct. 1996.

Kanskar et al., "Observation of leaky slab modes in an air–bridged semiconductor waveguide with a two–dimensional photonic lattice", *Applied Physics Letters*, vol. 70, No. 11, pp. 1438–1440, Mar., 1997.

D'Urso et al., "Modal reflectivity in finite–depth two dimensional photonic–crystal microcavities", *Journal of the Optical Society of America B*, vol. 15, No. 3, pp. 1115–1159, Mar., 1998.

Villeneuve et al., "Three–dimensional photon confinement in photon crystals of low–dimensional periodicity", *IEE Proceedings–Optoelectronics*, vol. 145, No. 6, pp 384–390, Dec., 1998.

Painter et al., "Defect modes of a two–dimensional photonic crystal in an optically thin dielectric slab", *Journal of the Optical Society of America B*, vol. 16, No. 2, pp. 275–285, Feb., 1999.

Aretz et al., "Reduction of Crosswalk and Losses of Intersecting Waveguide", *Electronics Letters*, vol. 24, No. 11, pp. 730–731, May, 1999.

Painter et al., "Two–Dimensinal Photonic Band–Gap Defect Mode Laser", *Science*, vol. 284, pp. 1819–1821, Jun., 1999.

Johnson et al., "Guided modes in photonic crystal slabs", *Physical Review B*, vol. 60, No. 8, pp. 5751–5758, Aug., 1999.

Bensity et al. "Radiation lossess of waveguide–based two–dimensional photonic crystals: Positive role of the substrate", *Applied Physics Letters*, vol. 76, No. 5, pp. 532–534, Jan., 2000.

Tokushima et al., "Lightwave propagation through a 120° sharply bent single–line–defect photonic crystal waveguide", *Applied Physics Letters*, vol. 76, No. 8, No. 8, pp. 952–954, Feb., 2000.

Pacradouni et al., "Photonic band structure of dielectric membranes periodically textured in two dimensions", *Physical Review B*, vol 62, No. 7, pp. 4204–4207, Aug., 2000.

Charlton et al., "Experimental investigation of photonic crystal waveguide devices and line–defect waveguide bends", *Materials Science and Engineering B*, vol. 74, pp. 17–24, 2000.

* cited by examiner

PLANAR PHOTONIC BANDGAP STRUCTURES FOR CONTROLLING RADIATION LOSS

CROSS-REFERENCE TO RELATED APPLICATION

This application relates to and claims priority benefits from U.S. Provisional Patent Application Ser. No. 60/230,056, filed Sep. 1, 2000, which is incorporated by reference herein in its entirety.

FIELD OF THE INVENTION

The present invention is directed to robust planar photonic bandgap structures. In particular, the present invention is directed to robust planar photonic bandgap structures that, in connection with guiding radiation, control (for example, minimize, reduce or increase) radiation losses by employing layered dielectric structures. The present planar photonic bandgap structures can be used in connection with waveguides, waveguide bends, waveguide crossings, filters, switches and fiber-coupling structures.

BACKGROUND OF THE INVENTION

The propagation of electromagnetic radiation (that is, visible, infrared, ultraviolet, TeraHertz, millimeter wave and microwave radiation) can be dramatically altered in periodically patterned devices. Such devices may comprise discrete regions of materials where each region possesses a distinct index of refraction, or regions of materials in which the indices of refraction vary continuously throughout each region. If the index contrasts (for example, the differences between the indices of refraction for the discrete regions) are sufficiently large, an optically opaque material can be formed, even though the device is composed of transparent dielectric materials. The properties of such materials have attracted great scientific interest over the last ten to fifteen years, and are considered likely candidates for applications involving telecommunications, optical signal processing and integrated optical circuits. The dielectric properties of those materials are commonly analogized to the electronic properties of crystals, which are characterized by, among other things, what is known as the forbidden energy gap. That analogy has led to the term "photonic bandgap" (PBG). The PBG is a range of frequencies over which electromagnetic radiation is unable to propagate, and a PBG structure is a structure that exhibits a photonic bandgap. To achieve a photonic bandgap for electromagnetic radiation at a radial frequency $\omega$, it is necessary to achieve a structure or material with a period on the order of the wavelength $\lambda$, where $\lambda=2\pi c/\omega$ and c is the speed of light in a vacuum. It is generally understood that a PBG structure or material is a structure or material through which electromagnetic radiation, at any frequency in the photonic bandgap, is unable to propagate in any direction and at any polarization. A photonic bandgap that exists irrespective of the direction or polarization of the electromagnetic radiation is known as a full photonic bandgap. Of course, it may be useful in practical applications to restrict the scope of the PBG (for example, to only one polarization), assuming that the material would be used only with light at a certain polarization.

Achieving a full photonic bandgap theoretically requires that the material be patterned in all three dimensions (that is, height, length and width). Such materials have been shown to function in the microwave region, and it has been suggested that they can function at optical frequencies. However, several challenges remain to be overcome: fabrication of uniform photonic bandgap material, patterning the material and adapting the material to applications such as waveguiding. Those challenges are at least initially attributable to the difficulty encountered in attempting to pattern materials in three dimensions on the scale of optical wavelengths of interest in telecommunications, which wavelengths are on the order of 1.5 $\mu$m.

One alternative to a full, three-dimensionally patterned PBG material is a patterned planar material. An example of such a patterned planar material is illustrated in FIG. 1, which shows a uniform planar PBG structure. As shown in FIG. 1, a planar PBG is patterned, for example, by chemical or other etching, with a periodic array of holes. In such a patterned device, it is possible to achieve a bandgap for light propagating at any direction in the plane and for any polarization. Such a patterned device can be characterized as a restricted version of a full, three-dimensional PBG. In a planar PBG structure, confinement of light within the plane of the layers is normally required, and is achieved by suitable choices for the indices of refraction of the constituent layers. As used herein, the phrase "index of refraction profile" is a characterization of the relationship between indices of refraction and corresponding depths of the material(s) at issue. It is generally known in the field of planar photonic bandgap structures that confinement of light to patterned layers is normally achieved where the index of refraction profile within the patterned layers features indices of refraction that are all or substantially all higher than the indices of refraction in the index of refraction profiles for the substrate and superstrate. As used herein, the term "substrate" means an unpatterned layer or layers that are underneath the patterned region and that affect the propagation of the optical mode. Such an unpatterned layer is to be contrasted with a physical support, which provides structural stability, mounting and the like, and which plays no significant role in determining the optical propagation properties of electromagnetic radiation modes in the PBG structure. As used herein, the term "superstrate" means an unpatterned layer or layers that are above the patterned region and that affect the propagation of the optical mode.

For the structure of FIG. 1, for example, confinement in the vertical direction is achieved by having an index of refraction profile in the planar PBG layer that features indices of refraction that are all or substantially all higher than the indices of refraction in the index of refraction profiles for the air superstrate and the unpatterned substrate. The disadvantage of the planar PBG over the three-dimensional PBG is the potential for radiation losses in the planar configuration due to out-of-plane scattering.

In some cases, the substrate and/or superstrate comprise air. Where both the substrate and superstrate comprise air, a free-standing "membrane structure" is formed, as shown in FIG. 2. As a practical matter, however, and as further shown in FIG. 2, a substrate comprising air necessarily has at least a second layer. Others have failed to recognize or appreciate the significance of that second layer(s) in controlling radiation loss. The structure of FIG. 2 also has a number of mechanical disadvantages, primarily relating to fragility and poor heat conduction away from the active PBG layer.

Importantly, PBG structures do support the propagation of electromagnetic radiation at frequencies outside the photonic bandgap. FIG. 1 illustrates light propagating in a PBG structure in such an allowed mode. Such allowed-mode propagation may be useful in applications such as beam collimation, prism-like refraction, and others. In such applications, it is important to control (for example, minimize, reduce or increase) radiation losses during propagation.

In addition to the above-mentioned applications, there are a number of other possible applications (for example, guiding light) for planar PBG structures that feature intentionally disturbed periodic structuring. FIG. 3, for example, shows such a defect waveguide based on the structure of FIG. 1, where a line of holes has been omitted during the patterning process. Analogous waveguide structures exist in the membrane geometry of FIG. 2, and are not illustrated here. In a waveguide such as that illustrated in FIG. 3, the surrounding undisturbed PBG regions are normally designed such that, at the desired frequency of operation, a photonic bandgap exists, thereby preventing light from entering the surrounding regions. In this way, light that is coupled into the waveguide (for example, from an external source) will remain in the waveguide. A key requirement for the suitability of such waveguides in practical applications is that they not suffer from large radiation losses.

The concept of guiding electromagnetic radiation (that is, light) in planar PBG structures, as described above, has led to interest in guiding light around bends of various angles. By way of example, FIG. 4 shows a 90-degree bend achieved by removing a series of holes from the periodic structure. For light transmitted around a bend to be useful, there should be a sufficiently high level of transmission of that light around the bend. Achieving a sufficiently high level of transmission requires (1) low reflection of light back along the incoming path and (2) low radiation (that is, light) losses caused by the structure.

Another planar PBG structure of interest is a waveguide crossing, which is illustrated in FIG. 5. In that device, it is desirable to achieve high transmission of light from an input waveguide to its matching output waveguide, while minimizing the unwanted transfer of energy to the second waveguide being crossed. Minimizing the unwanted coupling of energy can be achieved by suitable design of the crossing region. Suitable design of the crossing region includes controlling radiation loss as light passes through the crossing region from each input waveguide to its matching output waveguide.

Another generally known device in the field of planar photonic bandgap structures is a resonant cavity. A resonant cavity (sometimes referred to as a two-dimensional microcavity) can be used in filtering or active light-emitting devices to accomplish optical feedback. Others have attempted to control radiation losses in resonant cavities by surrounding a PBG region with air.

Referring to FIG. 6, a schematic planar PBG dispersion diagram shows the energies of electromagnetic modes as a function of the component of their wavevector in the plane of the PBG structure. FIG. 6 shows the dispersion curves for a particular polarization (for example, transverse electric (TE), wherein the electric field is polarized parallel to the plane of the PBG structure layers). The labels on the x-axis (Γ, X, M) indicate symmetry points in different directions.

The electromagnetic modes in a planar PBG structure can be understood with reference to FIG. 6. The first type of mode shown in FIG. 6 is a bound mode, which is confined to the PBG structure. That mode is shown in FIG. 6 by the solid lines. In a perfectly uniform and infinite planar PBG structure, the bound modes suffer no or essentially no radiation losses. In the presence of unintentional defects or imperfections, such as non-uniform holes or non-uniform spacing, however, the bound modes can suffer radiation losses. Likewise, in a device in which defects or imperfections are intentionally introduced (see, for example, FIGS. 3–5), the presence of defects spoils the periodicity, thereby causing radiation losses.

The second type of mode shown in FIG. 6 is a resonant mode, which is specifically shown by the dashed lines. In contrast to a bound mode, a resonant mode can be phase matched to freely propagating electromagnetic modes in the substrate, the superstrate or both. That potential for phase-matched coupling is graphically depicted by the light line in FIG. 6 (that is, by the dot-dashed line in FIG. 6). That light line indicates the dispersion relation (that is, the relation between frequency and wavevector) for light in the substrate and superstrate. The light line is described by $\omega=ck_\parallel/n$, where n is the index of refraction of the substrate or superstrate, as appropriate, and $k_\parallel$ is the in-plane wavevector. In FIG. 6, the indices of refraction for substrate and superstrate are assumed equal, so the light lines are coincident in all directions. Where the substrate and superstrate are different materials (that is, materials with different indices of refraction), there will be two distinct light lines in any direction. The transition from bound to resonant modes can be deduced from the position of the mode with respect to the light line, and as a bound mode crosses the light line, phase-matched coupling becomes possible. Such potential for coupling changes the modes from being bound (that is, suffering no radiation losses in a perfect defect-free structure) to being resonant.

A resonant mode, such as that shown at point (a) in FIG. 6, may propagate in a manner quite similar to that of the bound mode indicated by point (b) in FIG. 6, but will suffer from radiation losses even in an ideal planar PBG. The magnitude of radiation loss for a resonant mode is characterized by the quality (Q) factor of the mode, where Q is the ratio of the total energy stored in a mode to the rate of energy loss from the mode. A low radiation loss structure will have a high Q. Conversely, a high radiation loss structure will have a low Q.

Because of their inherent radiation losses, resonant modes might appear to be less desirable than bound modes for at least some applications. Resonant modes can be used, however, in any application in which light must be coupled into or out of the planar PBG structure (for example, into photodetectors or from optical sources), or in any application that involves intentional defects such as waveguide bends, resonators, etc. For example, many telecommunication applications in which optical signals are transmitted from one location to another within an optical integrated circuit utilize waveguide bends and/or resonators. Effectively controlling (for example, sufficiently reducing or minimizing) the radiation losses in resonant modes can result in an increased operational bandwidth for that circuit.

The dispersion curves for the bound and resonant modes, shown by the solid and dashed lines in FIG. 6, respectively, define the propagation of light in the planar PBG structure. For example, FIG. 6 shows that the band of energies indicated by the gray shaded region is forbidden (that is, there are no modes at that energy for the directions shown). A photonic bandgap occurs when this forbidden region is preserved for any direction of propagation in the plane. FIG. 6 illustrates the dispersion along two specific directions, and a thorough check of the behavior along the other directions is required to ensure a bandgap does exist.

While bound and resonant modes are useful, as outlined above, a third class of modes, continuum modes, is not. Continuum modes represent electromagnetic modes that propagate essentially unaffected by the PBG structure. Those modes resemble simple plane waves propagating in the superstrate (for example, in the air above the structure) or in the substrate. Those modes can exist at any frequency above the light line, as indicated by the cross-hatched region in FIG. 6. Unlike resonant and bound modes, which occur only at frequencies determined by a particular PBG structure, continuum modes can exist throughout the entire cross-hatched region. Continuum modes are the primary cause of radiation loss in two-dimensional planar photonic crystals that contain defects or imperfections, whether intentionally introduced or unintentionally caused by fabrication errors. Those defects or imperfections disrupt the periodic symmetry of the crystal, introducing substantial in-plane momentum to pure bound or resonant modes, coupling them to the continuum states, and causing radiation losses, as illustrated schematically in FIGS. 7 and 8.

In the field of planar photonic bandgap structures, there is, generally speaking, a lack of effective methods for assessing propagation properties of structures and guiding radiation. Indeed, assuming, as an initial matter, that propagation properties are properly measured and problems, such as radiation loss, are properly recognized, approaches taken by others to guide radiation and control radiation losses have been problematical, impractical or ineffective in one way or another or for one reason or another. For example, methods for controlling radiation losses that occur in conventional refractive index planar waveguides are generally known. One such method involves surrounding an unpatterned region with regions of planar PBG material. A serious problem with that method is that its implementation is often based upon calculations for planar PBG materials that are assumed to form structures that extend infinitely in the direction normal to the plane of the layers. Such two-dimensional calculations are inherently incapable of determining the losses of finite planar PBG structures, leading some researchers to conclude, erroneously, that such structures do not suffer radiation losses.

Planar PBG structures incorporating intentional defects (for example, holes) in which the hole size is not uniform throughout the structure are generally known, as is a planar PBG waveguiding structure formed from a mesh of needles or needle-like objects into which defects are formed by omitting selected needles or needle-like objects. However, persons utilizing such intentional defects (that is, non-uniformly-sized holes or omitted needles) have not suggested any way the structures may be designed to effectively control losses.

One suggested device for reducing radiation losses is a planar PBG structure formed on a substrate that itself comprises a one-, two- or three-dimensional photonic bandgap structure. A significant disadvantage of such a structure is that it requires complex substrate preparation. Complex preparation steps necessarily offset another of the expected advantages that planar PBG materials usually have over three-dimensional alternatives: a relatively simplified manufacturing process.

SUMMARY OF THE INVENTION

The claimed structures are robust planar photonic bandgap structures. One structure is an improved planar photonic bandgap structure for controlling radiation loss, comprising:
  (a) a patterned photonic bandgap region having at least one layer,
  (b) an unpatterned substrate having at least one layer, and
  (c) an unpatterned superstrate having at least one layer, wherein at least some radiation loss is controlled by the thickness of at least one of the layers. That is, at least some radiation loss due to out of plane scattering is controlled by the thickness of at least one of the layers. In another embodiment, at least some radiation loss due to out of plane scattering is controlled by the refractive index of at least one of the layers.

DESCRIPTION OF THE PREFERRED EMBODIMENTS

The present improved planar PBG structures achieve controlled radiation losses for resonant modes. The present improved planar PBG structures comprise a substrate, which is an important component for reducing radiation losses. Prior art membrane structures (as, for example, shown in FIG. 2) and the prior art, in general, do not recognize or appreciate the connection between a substrate and radiation loss.

Figure 1:
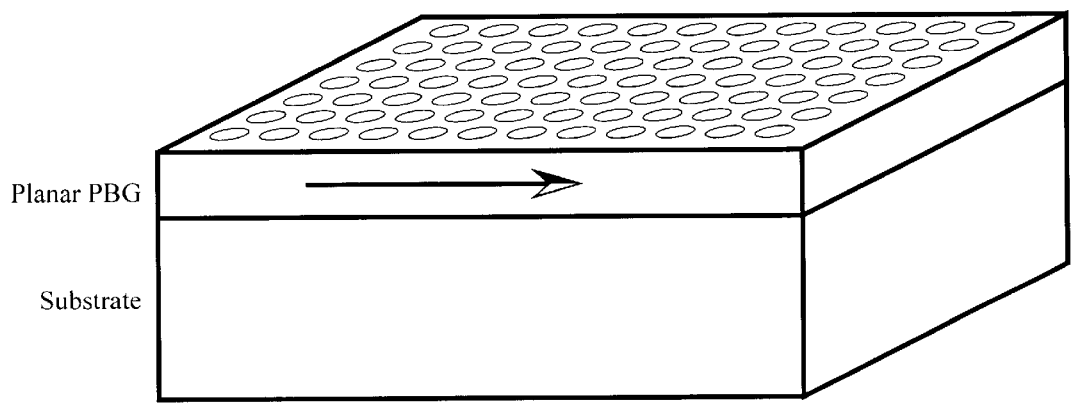
FIG. 1 is a perspective view of a planar photonic bandgap (PBG) structure showing light, at a frequency outside the bandgap, propagating in the plane.
Figure 2:
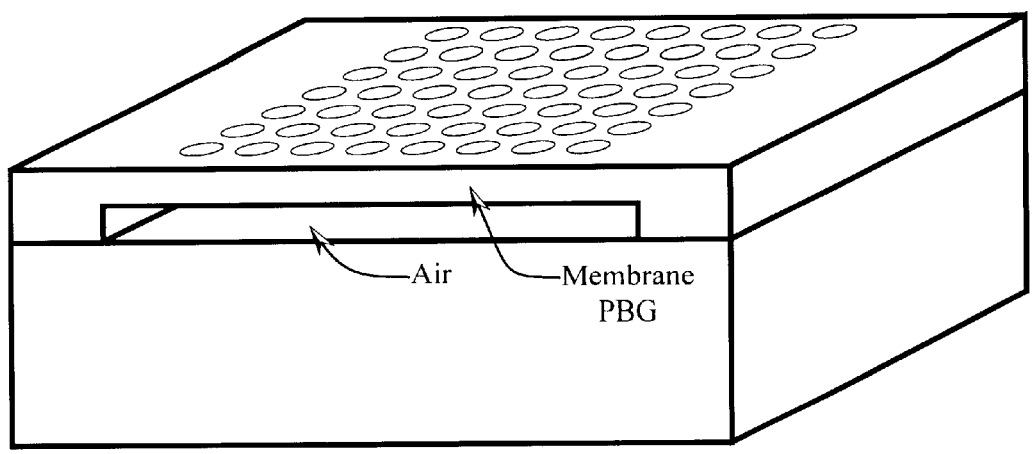
FIG. 2 is a perspective view of a membrane PBG structure.
Figure 3:
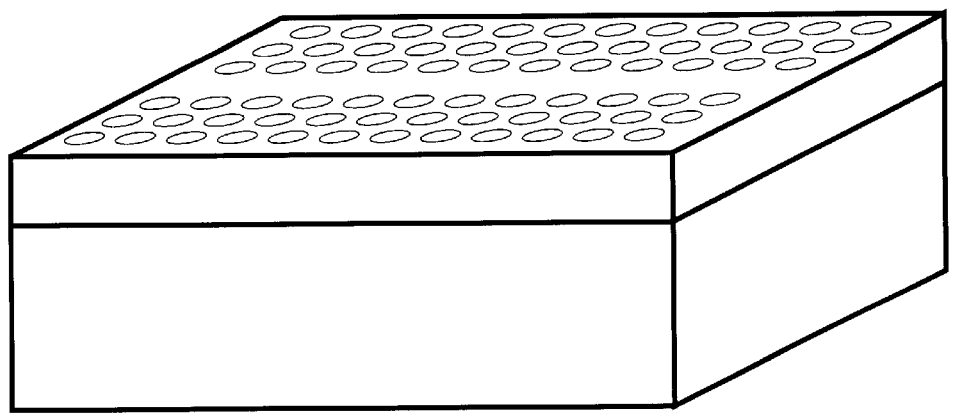
FIG. 3 is a perspective view of a planar PBG waveguide.
Figure 4:
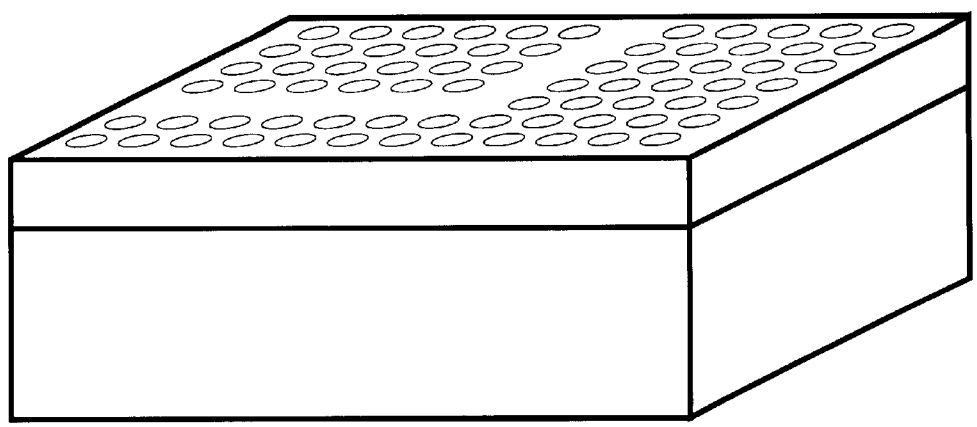
FIG. 4 is a perspective view of a planar PBG 90-degree (90°) bend.
Figure 5:
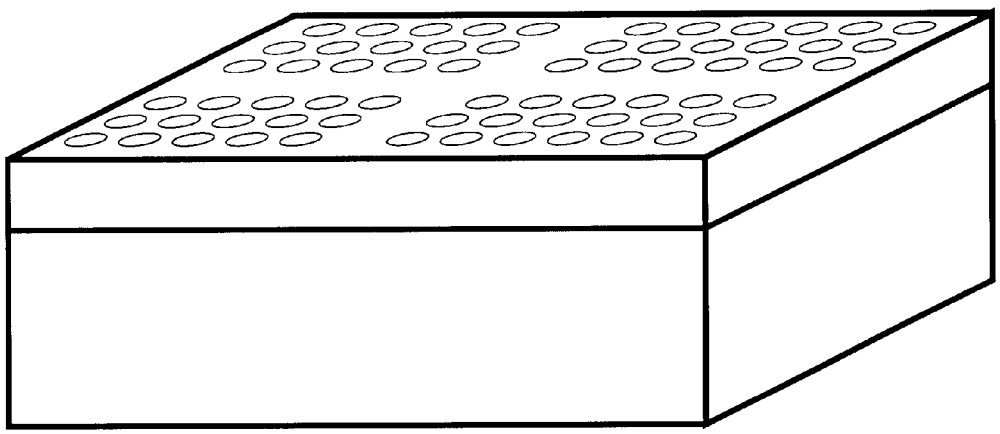
FIG. 5 is a perspective view of a planar PBG waveguide crossing.
Figure 6:
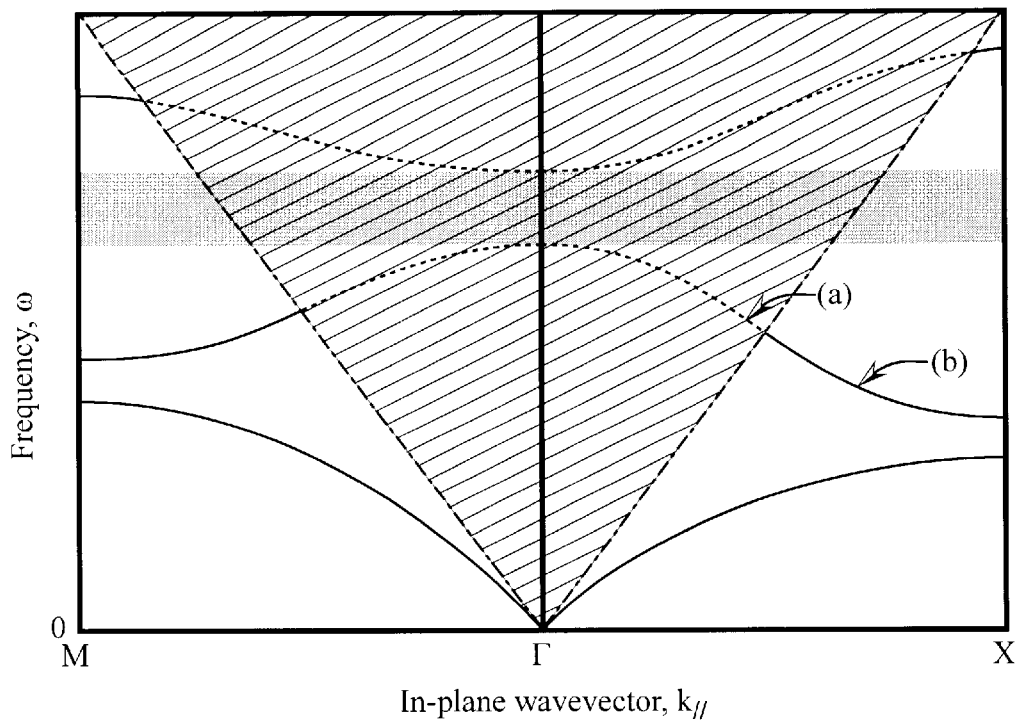
FIG. 6 is a representative planar PBG dispersion plot of frequency as a function of in-plane wavevector.
Figure 7:
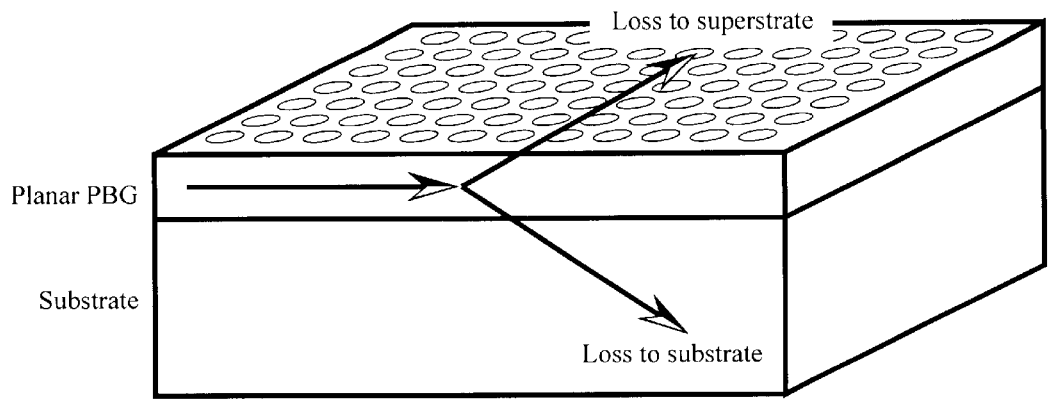
FIG. 7 is a perspective view showing radiation loss mechanisms in a planar PBG material.
Figure 8:
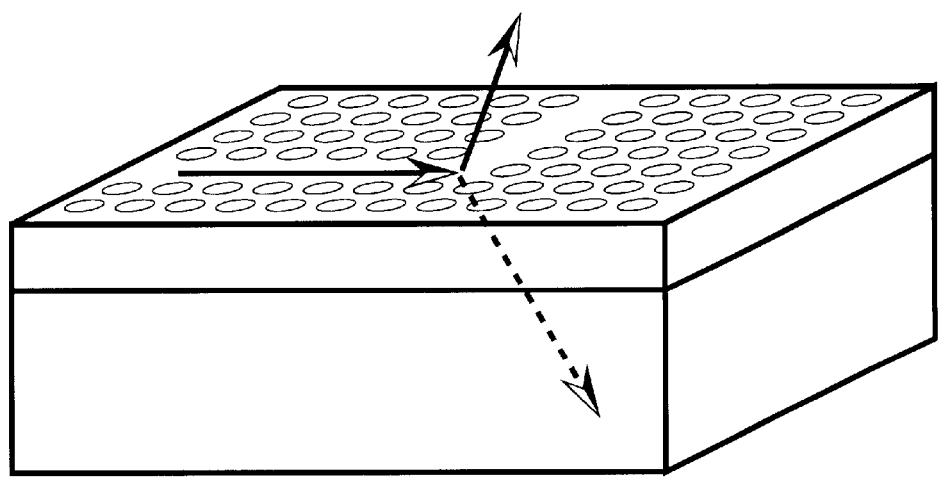
FIG. 8 is a perspective view showing radiation loss mechanisms in a planar PBG bend.
Figure 9:
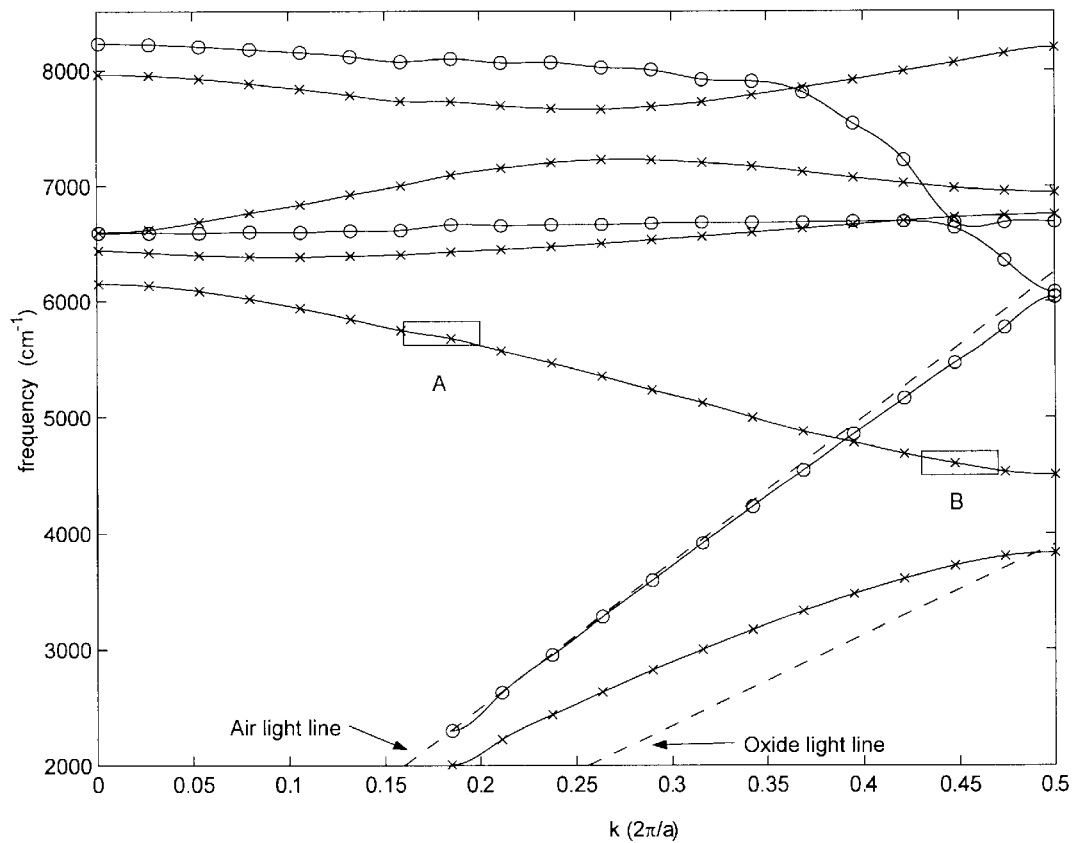
FIG. 9 shows the band structure for a square lattice photonic crystal membrane.

The membrane structure illustrated in FIG. 2 is a relatively simple structure and has been widely studied in the prior art. Bearing that membrane structure in mind, FIG. 9 shows the band structure calculated for a square lattice photonic crystal membrane with a pitch, "a", of 800 nm, a hole radius of 202 nm (that is, a hole diameter of 404 nm) and a patterned layer thickness of 130 nm. (The pitch refers to the spacing between the centers of adjacent holes). The membrane structure whose band structure is shown in FIG. 9 comprises GaAs (that is, gallium arsenide) and is suspended in air. The crosses and circles represent the band structure in the X crystal direction for s and p polarizations, respectively. The dashed line marked "air light line" represents the air (n=1) light line. The dashed line marked "oxide light line" represents the oxide (n=1.6) light line. The modes in the regions marked A and B are further considered below.

Figure 10:
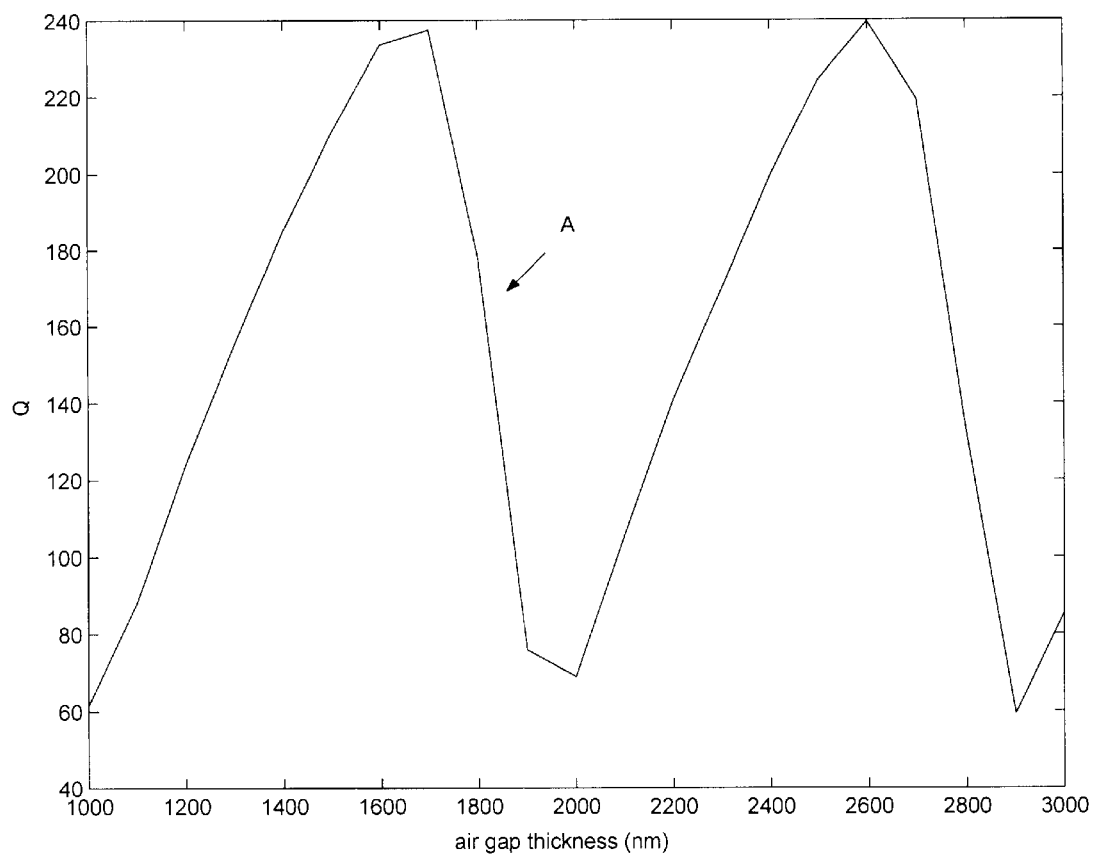
FIG. 10 shows the variation of the Q factor for a photonic crystal membrane over a substrate as a function of the air gap separating the membrane from the substrate.
Figure 11:
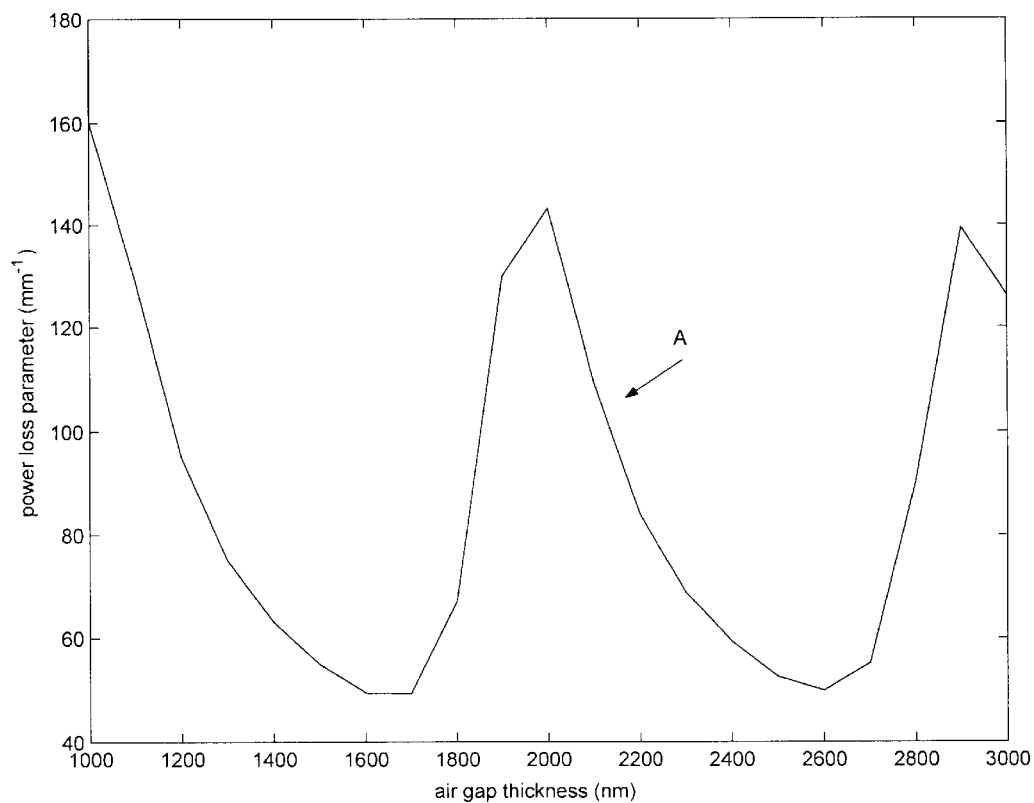
FIG. 11 shows the power loss parameter for the same structure described in FIG. 10 as a function of the air gap separating the membrane from the substrate.

Previous analyses of optical properties of prior art membrane structures have neglected, discounted or ignored the presence or effect of a substrate. Such approaches are not correct. For example, FIG. 10 shows the Q factor for the mode labelled "A" in FIG. 9 as a function of the air gap thickness separating the membrane from the substrate. It is apparent that the Q factor values are strongly influenced by air-gap thickness. In other words, the substrate can, in fact, play a role in the performance of the PBG structure and usually plays a substantial role in the performance of the PBG structure. Those facts and the fact that the substrate can play a role even in "membrane structures" have not been previously recognized or appreciated. As disclosed by this specification and the attached claims, it is also now apparent that Q factor values can be controlled or improved by suitable choice of air gap thickness. The corresponding values of the power loss parameter, $\alpha$, are shown in FIG. 11 for the same mode shown in FIG. 10. Because Q and $\alpha$ are inversely related, it is apparent that achievement of a maximum value of Q results in a minimum value for $\alpha$.

While a membrane structure has been thought to be a potentially effective device for controlling and reducing radiation losses (that is, because of the high index of refraction contrast that typically exists between the patterned PBG region and the air substrate and superstrate), a membrane structure has certain disadvantages, including mechanical fragility and poor heat conduction. In addressing those disadvantages, the present structures may comprise a photonic crystal with the same square lattice photonic crystal membrane structure discussed above, a patterned GaAs layer with a thickness of approximately 130 nm positioned directly on an unpatterned substrate comprising oxide and GaAs layers. One example of a suitable oxide is AlAs (that is, aluminum arsenide). However, it is understood that other high-Aluminum containing oxides may be suitable. For example, an alloy comprising AlGaAs may be used. Similarly, other oxides of InAlGaAs (that is, indium aluminum gallium arsenide) or InAlAs may be used. Such oxides are formed by methods generally known in the prior art, and those methods often involve exposure of aluminum-containing layers to elevated temperatures in humid (that is, steam) environments. For buried or internal layers, the oxidation process is often achieved by patterning, etching or other appropriate methods that use hole-like patterns or trenches that extend from the surface into the layer to be oxidized. In addition, oxides of silicon or silicon nitride may be incorporated into the present planar photonic bandgap structures. For the non-oxidized layers, suitable materials include GaAs, InP (that is, indium phosphide), Si (that is, silicon), InGaAs and InGaAsP.

Figure 12:
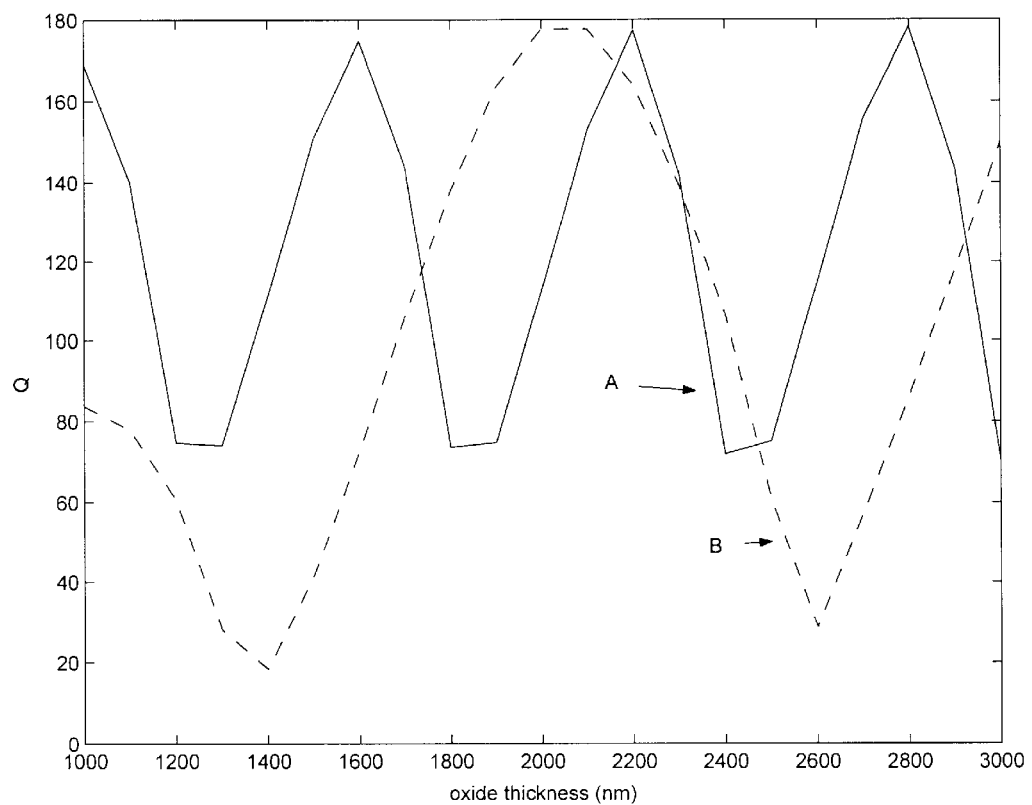
FIG. 12 shows the Q factor versus the thickness of the substrate oxide layer for a photonic crystal structure manufactured on an oxide/GaAs substrate. The solid and dashed curves represent data for modes A and B of FIG. 9, respectively.
Figure 13:
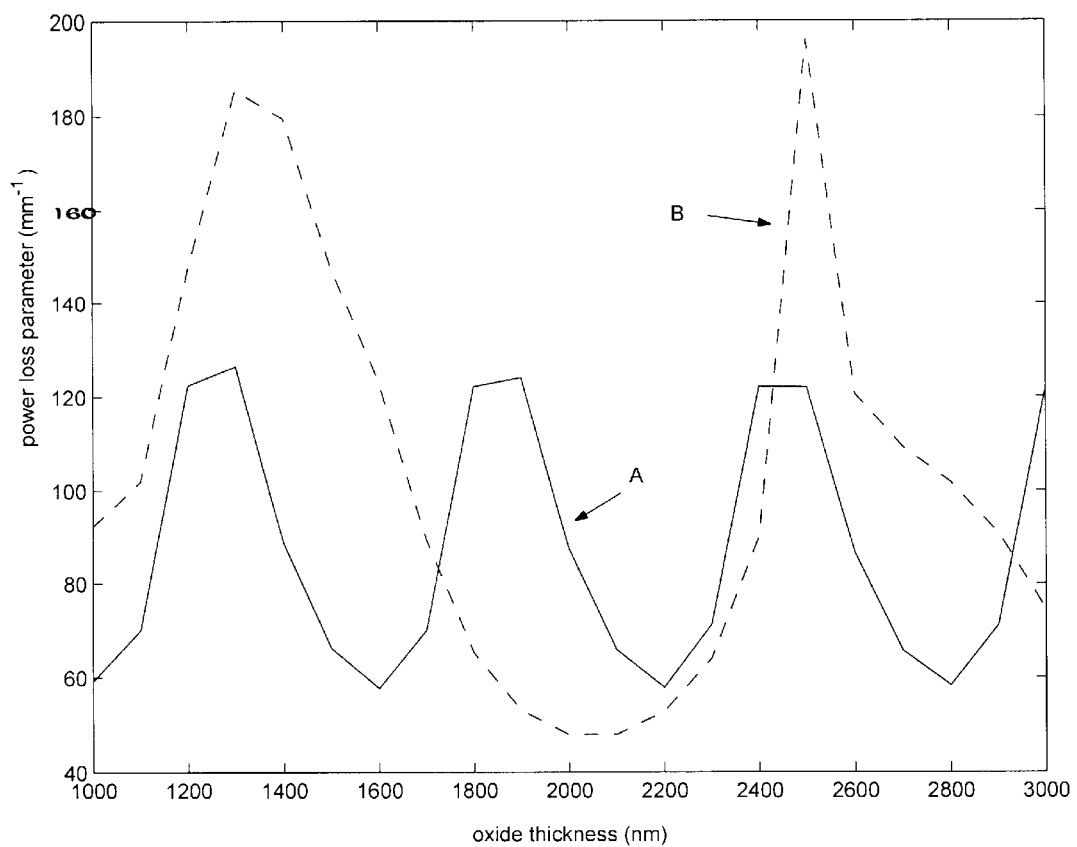
FIG. 13 shows the power loss parameter corresponding to the data in FIG. 12. The solid and dashed curves show data for modes A and B of FIG. 9, respectively.

For relatively thick oxides, the band structure for the modes we are considering (A and B in FIG. 9) is essentially unchanged from that shown in FIG. 9. FIG. 12 shows Q factor values for modes A and B in FIG. 9 plotted as a function of oxide thickness. FIG. 12 reveals at least two important points. First, behavior similar to that observed for a PBG membrane structure is observed for a two-layer substrate with a PBG. In other words, the Q factor is strongly influenced by layer thickness. In this case, the oxide layer thickness is playing a role analogous to that of the air gap in the membrane structure. Second, improved Q factor values can be obtained by suitable oxide thickness, and this is true for both modes A and B illustrated in FIG. 12. Furthermore, the maximum Q factor value that is attainable in that PBG structure on a two-layer substrate is approximately 180. A Q factor value of approximately 180 is comparable to the maximum Q factor value that is attainable in the membrane structure presented in FIG. 10—that is, approximately 240. Significantly, it has not been previously recognized that the Q factor is influenced by air gap thickness. Therefore, prior art membrane structures that were designed without regard to radiation loss control can be expected to have a substantial range of Q factor values. For the example illustrated in FIG. 10, it is apparent that a membrane structure designed without regard to radiation loss control will have Q factor values that range from approximately 60 to approximately 240. In comparison to those membrane structures, the present two-layer substrate structure, when optimized as described above, will have superior Q factor values in the majority of cases. FIG. 13 shows the corresponding loss parameters for that structure.

Figure 14:
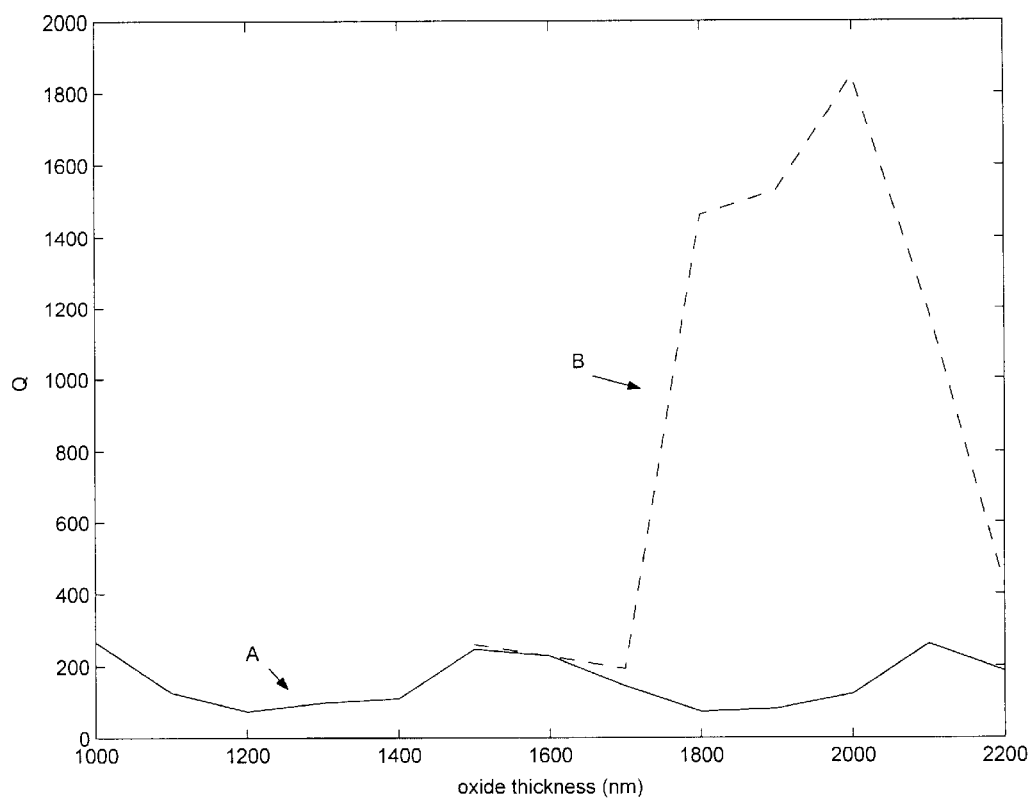
FIG. 14 shows the Q factor versus the thickness of the substrate oxide layers for a photonic crystal structure manufactured on an oxide/GaAs/oxide/GaAs substrate. The solid and dashed curves represent data for modes A and B of FIG. 9, respectively.
Figure 15:
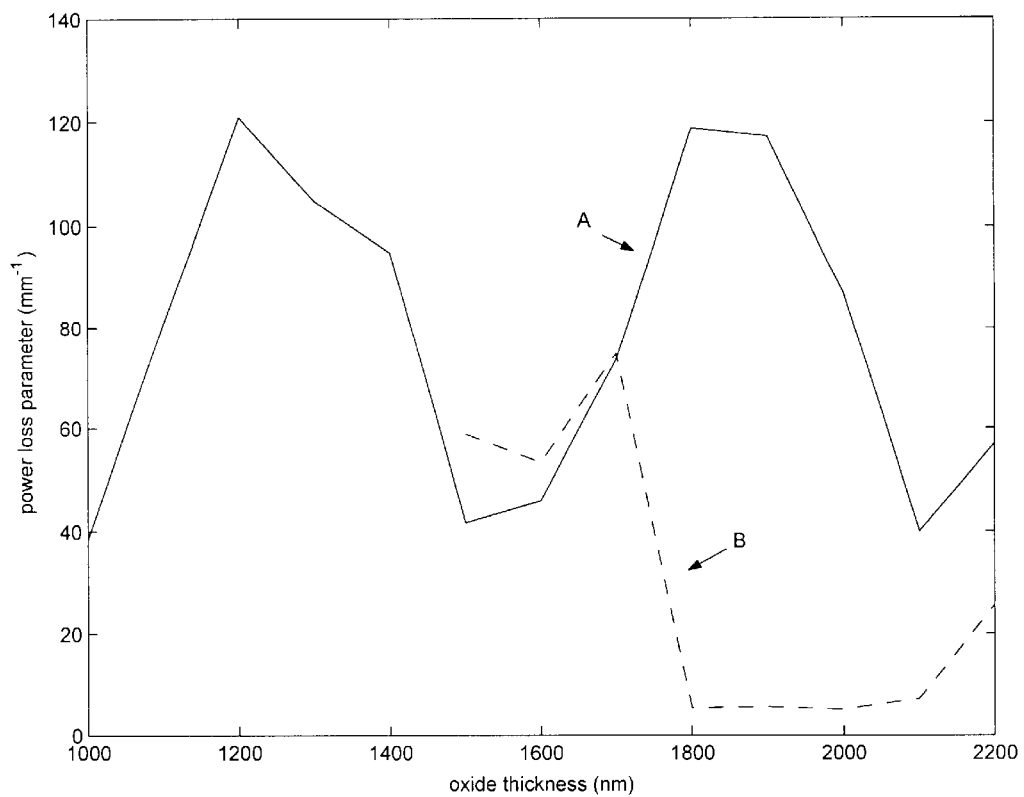
FIG. 15 shows the power loss parameter corresponding to the data in FIG. 14. The solid and dashed curves show data for modes A and B of FIG. 9, respectively.

More complex substrates may also be prepared. For example, it is possible to prepare a substrate comprising a single patterned GaAs layer, with the same patterning as used in the previous examples, situated on an oxide/GaAs/oxide/GaAs substrate. The thickness of the central or "sandwiched" GaAs substrate layer can be approximately 47% of the thickness of the oxide substrate layers, which can be equal or substantially equal. This choice of layer thicknesses is one approach to maintaining approximately equal optical path lengths in the three uppermost substrate layers. The band structure for modes A and B is still substantially the same as in FIG. 9. FIG. 14 shows the Q factor values for modes A and B of FIG. 9 as a function of oxide thickness. It is apparent that both modes A and B have enhanced Q factor values compared to the results of FIG. 12, and that the multi-layer substrate allows a dramatic enhancement, by approximately a factor of ten, in the maximum Q factor value for mode B. FIG. 15 shows the correspondingly improved (that is, reduced) loss coefficients.

Figure 16:
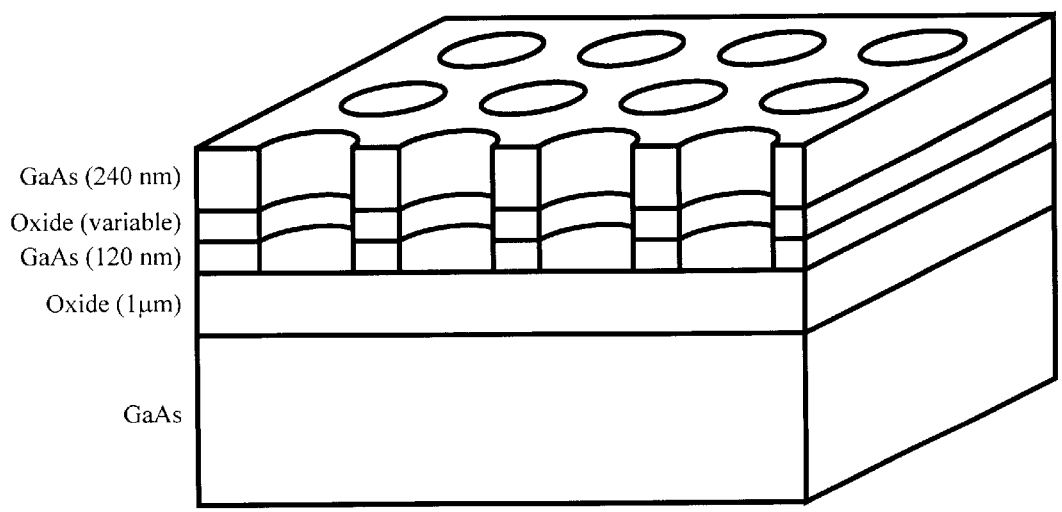
FIG. 16 is a perspective view of a preferred embodiment of the present low loss planar PBG structure, with a three-layer patterned region and two-layer substrate.

Multi-layer patterned regions can also be used to control radiation losses. FIG. 16, for example, depicts a representative two-layer substrate (the unpatterned oxide and GaAs layers) and a representative three-layer patterned region consisting of GaAs, oxide and GaAs layers. The effectiveness and benefits of that design become apparent by considering the effects produced by varying the thickness of the patterned oxide layer. For example, as one embodiment of the structure shown in FIG. 16, the photonic crystal would have a square lattice configuration with a pitch "a" of approximately 500 nm and a hole radius of approximately 141 nm. Further, the three-layer patterned region comprises a layer of GaAs with a thickness of approximately 240 nm, a layer of an oxide of variable thickness and a layer of GaAs with a thickness of approximately 120 nm, from top to bottom. The structure can be formed on an approximately 1 micron thick layer of oxide and a substrate comprising a GaAs layer, which is normally many hundred microns in thickness, (that is, a conventional GaAs wafer).

Figure 17:
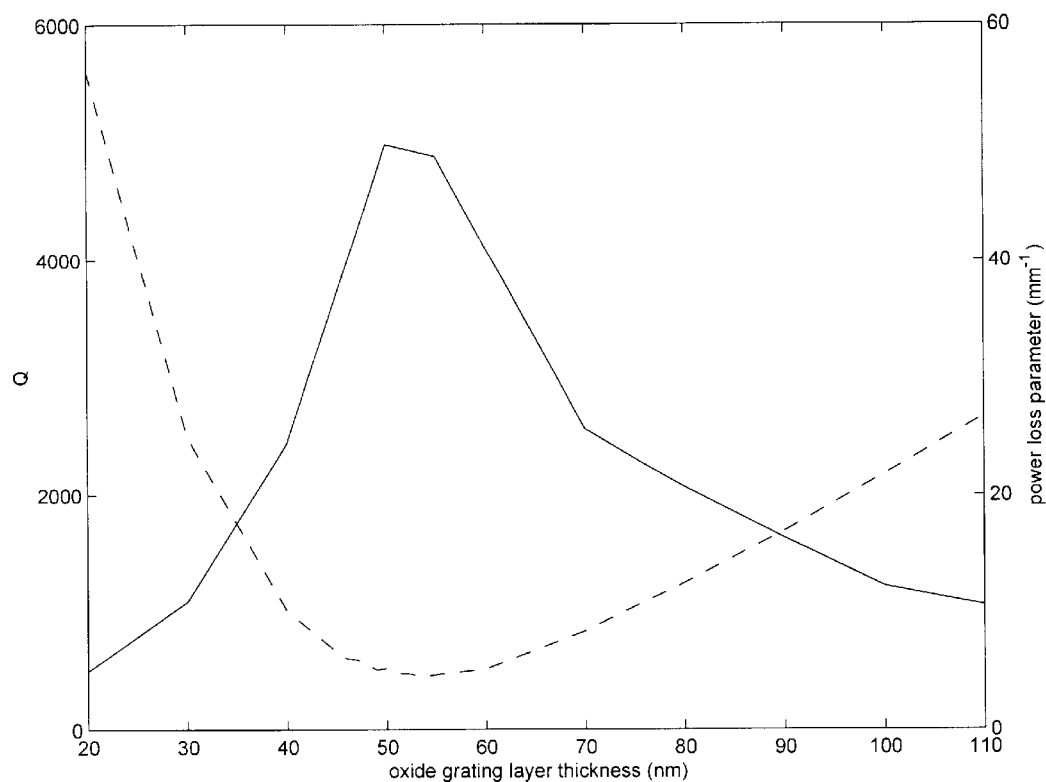
FIG. 17 shows the power loss parameter (dashed line) and the Q factor (solid line) versus oxide grating layer thickness for a three-grating-layer photonic crystal structure.

In FIG. 17, the solid line shows the Q factor value as a function of varying oxide thickness. That data is for a mode above the second order gap with an in-plane wave vector magnitude of approximately $0.15(2\pi/a)$. The data in FIG. 17 illustrates that a maximum Q factor value can be obtained by suitable choice of oxide thickness, and, therefore, that a three-layer patterned region can be used to improve (for example, reduce) losses compared to single-layer PBG structures. The corresponding loss parameter is shown by the dashed line in FIG. 17.

Significantly, specific combinations of materials, patterns, respective material thicknesses and the number of respective material layers are in many, if not all, cases dependent upon several factors, including the desired degree of radiation loss control, the particular application or end use, manufacturing or supply constraints or concerns or some combination thereof. The embodiments of materials, patterns, material thicknesses and material layers set forth above are exemplary. Those embodiments are not intended to be and are not in any way limiting.

While the present planar PBG structures utilize GaAs and an oxide formed from steam oxidization of AlAs, other structures (comprising other suitable materials) will be evident to those skilled in the art. Also, the same or similar results achieved by varying layer thickness or layer thicknesses can be achieved by changing the refractive index of the layer or refractive indices of the layers. (A refractive index is most easily changed by a change of material.) For example, the effect of increasing layer thickness can be achieved by retaining a constant layer thickness, while increasing the refractive index of the layer. Use of layer thickness variation rather than refractive index variation is normally preferred, because it is, generally speaking, more practical to vary layer thickness(es) than it is to vary a refractive index(-ices). Further, while we have illustrated designs using square lattice arrangements of the periodic patterning, it will be apparent to one skilled in the art that triangular, honeycomb, or other lattices could be used.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A planar photonic bandgap structure for controlling radiation loss due to out of plane scattering from a selected mode, the structure comprising:
   a patterned photonic bandgap region in which the selected mode can propagate, the photonic bandgap region having at least one layer,
   an unpatterned substrate having at least one layer, and
   an unpatterned superstrate having at least one layer,
       wherein a quality factor, Q, of the mode varies as a function of a thickness of one of the layers and the thickness of the one of the layers is such that Q has a value that is substantially maximized.

2. The planar photonic bandgap structure of claim 1, wherein the patterned photonic bandgap region is patterned with a pattern of holes.

3. The planar photonic bandgap structure of claim 2, wherein the holes are of substantially equal diameter.

4. The planar photonic bandgap structure of claim 2, wherein the holes are of substantially equal depth.

5. The planar photonic bandgap structure of claim 1, wherein the patterned photonic bandgap region is patterned with a square lattice.

6. The planar photonic bandgap structure of claim 1, wherein the patterned photonic bandgap region is patterned with a triangular lattice.

7. The planar photonic bandgap structure of claim 1, wherein the patterned photonic bandgap region is patterned with a honeycomb lattice.

8. The planar photonic bandgap structure of claim 1, wherein at least one of the layers comprises GaAs.

9. The planar photonic bandgap structure of claim 1, wherein at least one of the layers comprises InGaAs.

10. The planar photonic bandgap structure of claim 1, wherein at least one of the layers comprises InP.

11. The planar photonic bandgap structure of claim 1, wherein at least one of the layers comprises InGaAsP.

12. The planar photonic bandgap structure of claim 1, wherein at least one of the layers comprises Si.

13. The planar photonic bandgap structure of claim 1, wherein at least one of the layers comprises oxidized AlAs.

14. The planar photonic bandgap structure of claim 1, wherein at least one of the layers comprises oxidized AlGaAs.

15. The planar photonic bandgap structure of claim 1, wherein at least one of the layers comprises oxidized InGaAlAs.

16. The planar photonic bandgap structure of claim 1, wherein at least one of the layers comprises oxidized InAlAs.

17. The planar photonic bandgap structure of claim 1, wherein at least one of the layers comprises silicon dioxide.

18. The planar photonic bandgap structure of claim 1, wherein at least one of the layers comprises silicon nitride.

19. The planar photonic bandgap structure of claim 1, wherein at least one of the layers comprises silicon oxynitride.

20. The planar photonic bandgap structure of claim 1, wherein the substrate is a two-layer substrate comprising a layer of an oxide and a layer at GaAs.

21. The planar photonic bandgap structure of claim 1, wherein the substrate is a four-layer substrate comprising a first layer of an oxide, a second layer of GaAs, a third layer an oxide and a fourth layer of GaAs.

22. The planar photonic bandgap structure of claim 1, wherein the patterned region is a single-layer region comprising GaAs.

23. The planar photonic bandgap structure of claim 1, wherein the patterned region is a three-layer region comprising a first layer of GaAs, a second layer of an oxide and a third layer of GaAs.

24. The planar photonic bandgap structure of claim 1, wherein the patterned photonic bandgap region comprises at least two sections such that each section is patterned with etchings of substantially equal depth and the depth of etchings varies by section.

25. The planar photonic bandgap structure of claim 1, wherein the mode is an a polarization mode.

26. The planar photonic bandgap structure of claim 21, wherein the first and third layers are substantially equal in thickness.

27. The planar photonic bandgap structure of claim 26, wherein the second layer is thinner than the first and third layers.

28. The planar photonic bandgap structure of claim 27, wherein the second layer has a thickness of approximately 47% of a thickness of the first and third layers.

29. The planar photonic bandgap structure of claim 1 wherein the one layer is a layer of the substrate.

30. The planar photonic bandgap structure of claim 1 wherein the patterned photonic bandgap region comprises a plurality of layers and the one layer is a layer of the the patterned photonic bandgap region.

31. The planar photonic bandgap structure of claim 1 wherein the one layer is a layer of the superstrate.

32. A planar photonic bandgap structure for controlling out of plane radiation loss from a selected mode, the structure comprising:

a patterned photonic bandgap region in which the selected mode can propagate, the photonic bandgap region having at least one layer, an unpatterned substrate having at least one layer, and an unpatterned superstrate having at least one layer, wherein a quality factor, Q, of the mode varies as an oscillating function of a thickness of one of the layers and the thickness of the one of the layers is such that Q has a value exceeding a median value of Q over a range including at least one maximum and at least one minimum of the oscillating function.

33. A photonic bandgap structure according to claim 32 wherein the one of the layers is a top layer of the substrate.

34. A planar photonic bandgap structure according to claim 32 wherein the one of the layers is a layer of the superstrate in contact with the photonic bandgap region.

35. A planar photonic bandgap structure according to claim 32 wherein the photonic bandgap region comprises a plurality of layers including a central layer and the one of the layers is the central layer.

36. A method for controlling out of plane radiation loss from a selected mode in a planar photonic bandgap structure comprising a patterned photonic bandgap region in which the selected mode can propagate, the photonic bandgap region having at least one layer; an unpatterned substrate having at least one layer; and, an unpatterned superstrate having at least one layer;

the method comprising:

for at least one of the layers determining a quality factor, Q, of the mode, or a mathematical equivalent thereof, as a function of thickness of the at least one of the layers;

determining a thickness corresponding to a desired value for Q; and, making the layer in the determined thickness.

* * * * *